(12) United States Patent
Morris et al.

(10) Patent No.: US 11,308,778 B2
(45) Date of Patent: Apr. 19, 2022

(54) SENSOR MONITORING AND MAPPING IN A TRANSLATED COORDINATE SYSTEM

(71) Applicant: BuildingDNA, Denver, CO (US)

(72) Inventors: Glenn Morris, Denver, CO (US); Jonathan E. Shuster, Centennial, CO (US); Anete Fridrihsone, Bauskas novads (LV)

( * ) Notice: Subject to any disclaimer, the term of this patent is extended or adjusted under 35 U.S.C. 154(b) by 157 days.

(21) Appl. No.: 16/753,728

(22) PCT Filed: Oct. 4, 2018

(86) PCT No.: PCT/US2018/054354
§ 371 (c)(1),
(2) Date: Apr. 3, 2020

(87) PCT Pub. No.: WO2019/070967
PCT Pub. Date: Apr. 11, 2019

(65) Prior Publication Data
US 2020/0258360 A1   Aug. 13, 2020

Related U.S. Application Data

(60) Provisional application No. 62/568,735, filed on Oct. 5, 2017.

(51) Int. Cl.
| G08B 13/196 | (2006.01) |
| H04W 4/33 | (2018.01) |
| H04N 7/18 | (2006.01) |

(52) U.S. Cl.
CPC .......... *G08B 13/19693* (2013.01); *G08B 13/19656* (2013.01); *G08B 13/19682* (2013.01); *H04N 7/183* (2013.01); *H04W 4/33* (2018.02)

(58) Field of Classification Search
CPC .................................. G08B 13/19693
See application file for complete search history.

(56) References Cited

U.S. PATENT DOCUMENTS

| 2009/0043504 | A1* | 2/2009 | Bandyopadhyay | G01S 19/48 |
| | | | | 701/469 |
| 2011/0189975 | A1* | 8/2011 | Gunasekara | H04W 4/026 |
| | | | | 455/404.2 |
| 2014/0278060 | A1* | 9/2014 | Kordari | G01C 21/206 |
| | | | | 701/422 |

OTHER PUBLICATIONS

International Preliminary Report on Patentability dated Apr. 16, 2020 in related application No. PCT/US2018/054354, all pgs.
(Continued)

*Primary Examiner* — Roland J Casillas

(57) ABSTRACT

Described herein are methods and systems for providing an integrated system for sensor monitoring and mapping in a translated coordinate system. One general aspect can include translating a digital map of a geographical region in a global positioning coordinate system to a translated coordinate system, where the geographical region includes a physical building. The method can also include generating digital interior maps of the physical building in the translated coordinate system and including on the maps control elements associated with devices physically located within the geographical region. The method can also include receiving, from a sensor data interceptor, sensor data from the devices. The method can also include providing a graphical user interface for viewing the digital maps and the sensor data associated with the physical devices on the map to provide a holistic view of the geographical region, including the exterior and interior of the physical building.

15 Claims, 10 Drawing Sheets

(56) References Cited

OTHER PUBLICATIONS

International Search Report and Written Opinion dated Dec. 11, 2018 in related application No. PCT/US2018/054354, 10 pgs.

* cited by examiner

SENSOR MONITORING AND MAPPING IN A TRANSLATED COORDINATE SYSTEM

CROSS REFERENCE TO RELATED APPLICATIONS

This application is a U.S. National Phase of PCT Patent Application No. PCT/US2018/054354, filed on Oct. 4, 2018, which claims the benefit of and priority to U.S. Provisional Patent Application Ser. No. 62/568,735, filed Oct. 5, 2017, entitled "SENSOR MONITORING AND MAPPING IN A TRANSLATED COORDINATE SYSTEM," which are each assigned to the assignee hereof and incorporated in their entirety by reference herein for all purposes.

BACKGROUND

Many buildings include surveillance and other equipment that can be monitored and/or that provide sensor data. However, the ability to consistently monitor and surveil these buildings is limited because each device is proprietary from one of various manufacturers and therefore has limited ability to integrate the monitoring into a single interface. Further, there is no holistic or global view available for the system in which the person or user surveilling and/or monitoring the building can see clearly how the device providing the sensor data corresponds to other data or where it is coming from within the building. Accordingly, new and improved methods and systems are needed.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method that can include translating a first digital map of a geographical region in a global positioning coordinate system to a second digital map of the geographical region in a translated coordinate system, where the geographical region includes a physical building. The method can also include generating digital interior maps, each digital interior map describing a portion of an interior of the physical building in the translated coordinate system. The method can also include generating control elements, each control element being associated with a device physically located within the geographical region. The method can also include attaching each control element to one of the digital interior maps or the second digital map. The method can also include receiving, from a sensor data interceptor, sensor data from the devices. The method can also include providing a graphical user interface for viewing the digital interior maps, the second digital map, and the sensor data. Other embodiments of this aspect include corresponding computer systems, apparatus, and computer programs recorded on one or more computer storage devices, each configured to perform the actions of the methods.

Implementations may include one or more of the following features. For example, the method can optionally include receiving, via the graphical user interface, a selection of a first control element. The method may also include updating the graphical user interface with current sensor data for a first device associated with the first control element in response to the selection.

The method can optionally include receiving, via the graphical user interface, a selection of a first control element, where the first control element is associated with a security camera. The method may also include updating the graphical user interface with a video feed from the security camera.

The method can optionally include receiving, via the graphical user interface, a hold command and a set value for a first control element, the first control element being associated with a thermostat. The method may also include sending an instruction, by the computer system, to the thermostat to set the thermostat to the set value and disable an interface of the thermostat.

The method can optionally include identifying sensor data for a first device that exceeds a threshold value. The method may also include sending an alert to an electronic address of a user including a notification that the sensor data for the first device exceeds the threshold value. The method may also include updating a control element associated with the first device with an indicator of an alert status. Optionally, the method can include that the indicator of the alert status includes at least one of modifying a color of the control element or adding a flashing indicator to the control element. Optionally, the method can include that the notification includes a link that, when selected on a computer of the user, launches the graphical user interface on the computer displaying a view of the control element.

Optionally, the method can include that a first device of the devices is manufactured by a first manufacturer and a second device is manufactured by a second manufacturer. Implementations of the described techniques may include hardware, a method or process, or computer software on a computer-accessible medium.

BRIEF DESCRIPTION OF THE DRAWINGS

The disclosure will be readily understood by the following detailed description in conjunction with the accompanying drawings, wherein like reference numerals designate like elements, and in which.

DETAILED DESCRIPTION

In the following description, for the purposes of explanation, specific details are set forth in order to provide a thorough understanding of example embodiments. However, it will be apparent that various embodiments may be practiced without these specific details. For example, systems, algorithms, structures, techniques, networks, processes, and other components may be shown as components in block diagram form in order not to obscure the embodiments in unnecessary detail. The figures and description are not intended to be restrictive.

Embodiments described herein include systems and methods for providing sensor monitoring and mapping in a translated coordinate system using a user interface that provides a holistic view of a given geographical region including a physical building. The area can be mapped from a global positioning coordinate system onto a translated coordinate system for use by the system. The geographical region and exterior of the physical building can be mapped in the translated coordinate system onto a digital map for viewing in the user interface by a central server. The interior of the physical building can be mapped in the translated coordinate system and can also be viewable in the user interface. Various sensor providing devices such as security cameras, heating and cooling systems, generators, smoke and carbon monoxide detectors, refrigeration unit thermostats, and so forth can be mapped onto the digital maps. The output sensor data can be captured by a sensor data interceptor and reformatted to be compatible with and usable by the user interface computer system. The sensor data interceptor can transmit the reformatted sensor data to the central server. The central server can map the sensor data to the devices depicted in the digital map, and provide alerts and other notifications to users of the user interface that incorporate the sensor data within the map for a holistic view of the health of the building.

Figure 1:
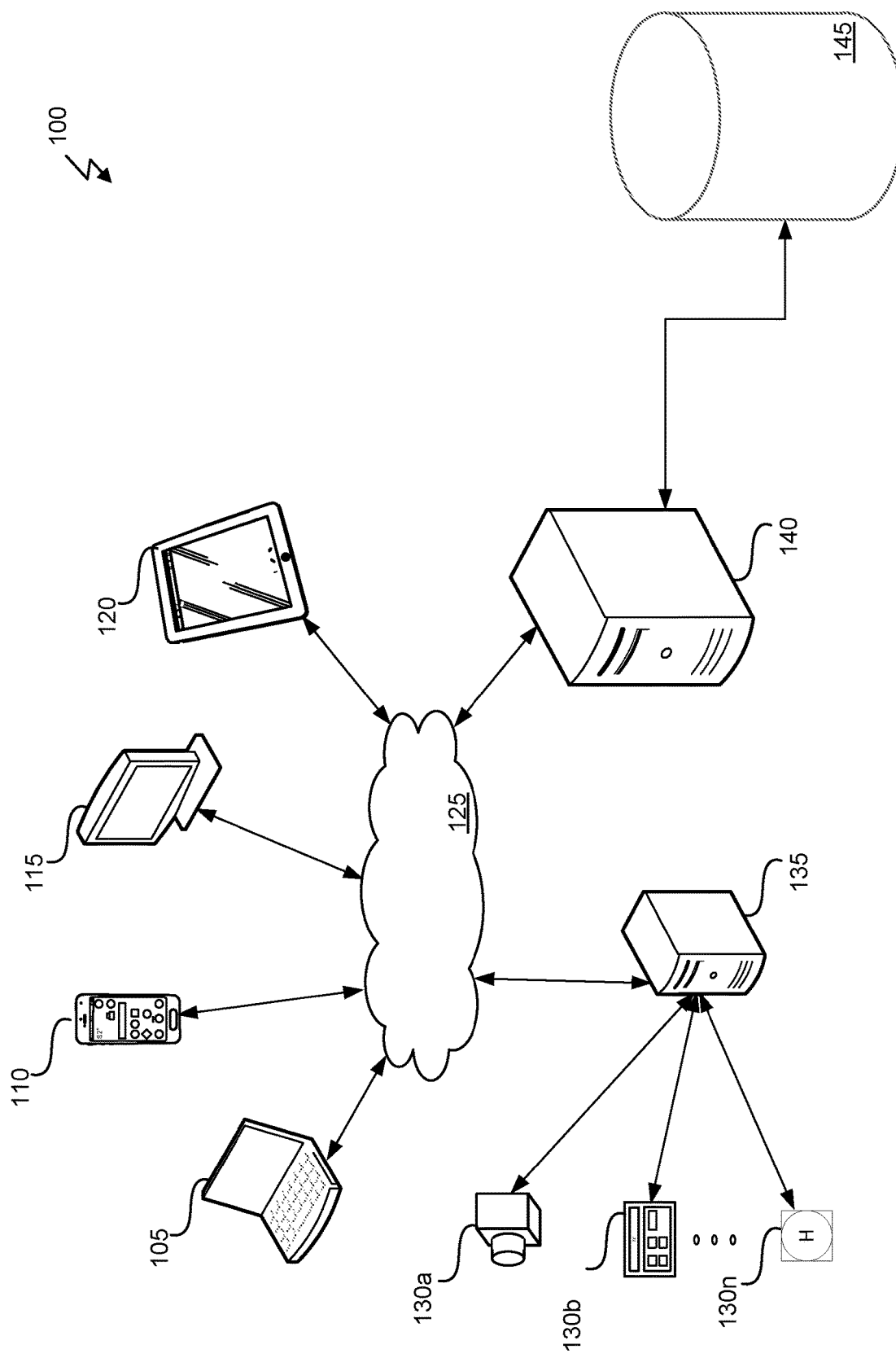
FIG. 1 illustrates a simplified system for providing sensor monitoring and mapping in a translated coordinate system.

FIG. 1 illustrates a simplified system 100 for providing sensor monitoring and mapping in a translated coordinate system. The system 100 can include user devices including a laptop 105, a smart phone 110, a desktop computer 115, and a tablet 120. The system 100 can also include a network 125, a sensor data interceptor 135, devices 130a through 130n, a central server 140, and a database 145.

The user devices including laptop 105, smart phone 110, desktop computer 115, and tablet 120 can be any device that allows communication with central server 140 and display of a user interface as described in more detail herein. For example, user devices can include laptop computers, desktop computers, tablet devices, smartphones, or any other suitable computing device. While only 4 devices are depicted in FIG. 1, any number (more or fewer) of user devices including laptop 105, smart phone 110, desktop computer 115, and tablet can exist within system 100 and communicate over network 125.

The network 125 can be can be any type of network including the Internet, a local area network ("LAN"), a wide area network ("WAN"), a virtual network, a cloud network, or a telecommunications network. Network 125 can be implemented as a wired network and/or wireless network.

The devices 130a through 130n can be any devices that provide output sensor data and/or surveillance data. For example, one or more of devices 130a through 130n can be a security camera 130a, a thermostat 130b, a carbon monoxide detector, a smoke detector, a temperature sensor within a cooling unit (e.g., a freezer or refrigeration unit), a motion detector, or any other device that outputs sensor data.

While three devices including security camera 130a, thermostat 130b, and device 130n are depicted in FIG. 1, and number (more or fewer) can be included in system 100. The devices can be located throughout a building which can be located within a geographical location. Devices 130a through 130n can be communicatively coupled to sensor data interceptor 135 by wired or wireless connections.

Figure 12:
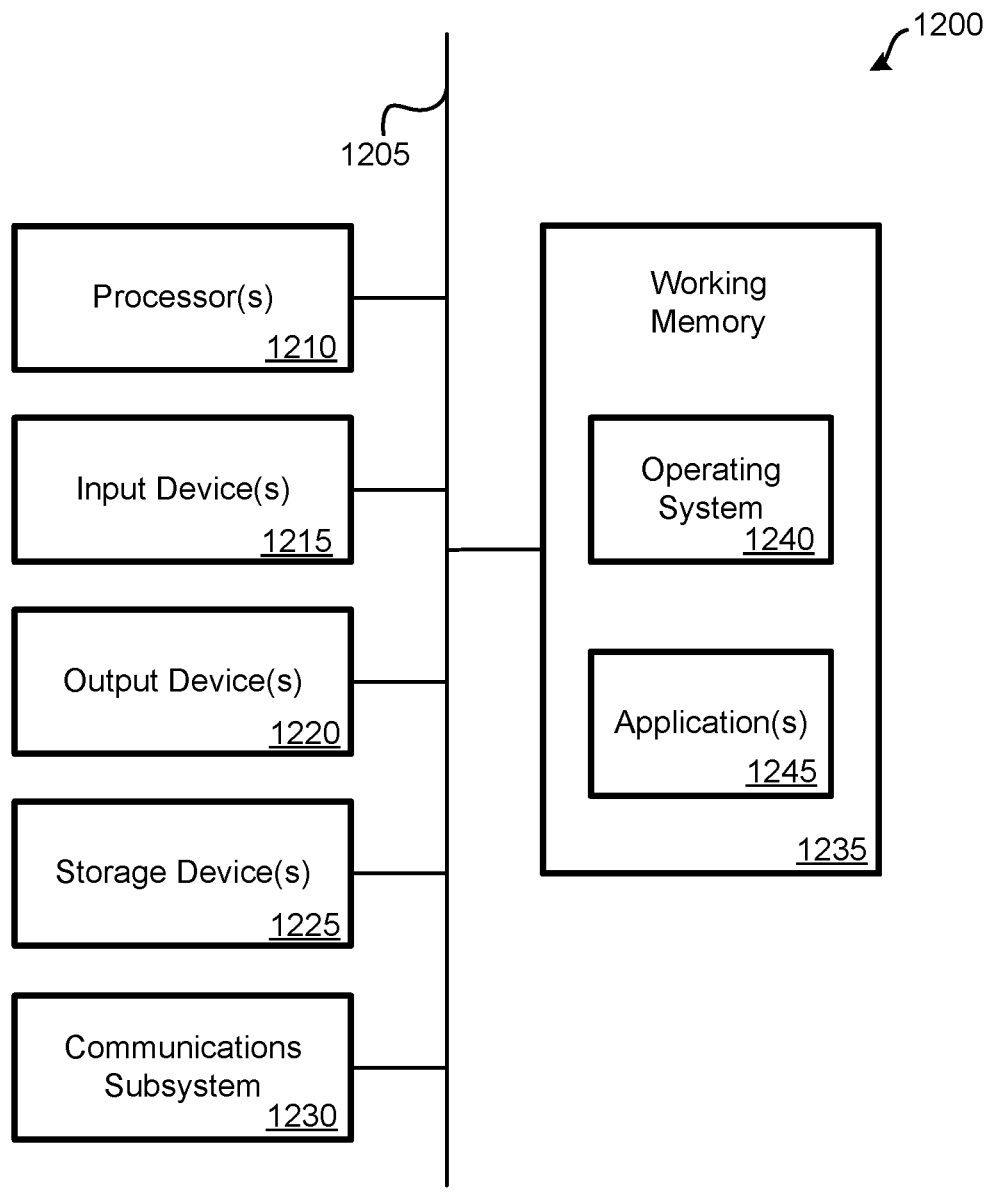
FIG. 12 illustrates an embodiment of a computer system.

The sensor data interceptor 135 can be any suitable server or computer system such as computer system 1200 as described with respect to FIG. 12. The sensor data interceptor 135 can be located within the building that houses the devices 130a through 130n or can be located remotely from the building. The sensor data interceptor 135 can intercept sensor data from each of the devices 130a through 130n. The sensor data interceptor 135 can communicate with the devices 130a through 130n through a local network, network 125, a direct wired connection, a wireless connection, or any other suitable connection.

The central server 140 can be any suitable server or computer system such as computer system 1200 as described with respect to FIG. 12. The central server can provide a user interface application to the user devices including laptop 105, smart phone 110, desktop computer 115, and tablet 120 that depicts the building that houses the devices 130a through 130n. The central server 140 can communicate with the user devices including laptop 105, smart phone 110, desktop computer 115, and tablet 120 through network 125. The central server 140 can receive information about the devices 130a through 130n from the sensor data interceptor through network 125. The central server 140 can communicate with database 145 through a local network, network 125, a direct wired connection, a wireless connection or any other suitable connection. The central server 140 can be housed at any suitable facility and connected to customer installations in a cloud computing arrangement using standard internet connection protocols.

The database 145 can be any suitable database for storing data related to the physical building in the geographical region including information regarding the devices 130a through 130n, the user devices including laptop 105, smart phone 110, desktop computer 115, and tablet 120, the digital maps generated by the central server 140, and any other suitable data about users of the system or other information useful for the user interface described in more detail herein.

In use, central server 140 can receive an image of a geographical region. Central server 140 can also receive global positioning system ("GPS") coordinates for the geographical region. The geographical region can be selected based on a physical building within the geographical region. For example, a customer can have a building for which the customer would like to implement sensor monitoring and mapping. In some embodiments, central server 140 can receive the image and/or the GPS coordinates from one of the user devices 105, 110, 115, and/or 120. In some embodiments, central server 140 can receive the image and/or the GPS coordinates from a different computer system. In some embodiments, a user can upload the image and/or the GPS coordinates to database 145, and central server 140 can retrieve the image and/or GPS coordinates from database 145.

Central server 140 can translate the global positioning system coordinates into a translated coordinate system. For example, the coordinates at the top, left corner of the image can be translated to a translated coordinate system setting the top, left corner of the image to (0, 0) for example in an (x, y) coordinate system. As an alternative example, the center of the image can be designated (0, 0) in the translated (x, y) coordinate system. The z axis (e.g., in an (x, y, z) coordinate system) can be the floor of the building. For example, each floor of the physical building can be assigned a number indicating an increasing value for the z axis as the floors increase. Further, the x and y values can be measured in any suitable value including, for example, a scaled value. For example, 1 foot in distance can be scaled to 1 inch on the digital line drawings. As an example, Rm 108 in FIG. 4 can have an upper left corner 410. Upper left corner 410 can have, for example, an x value of 71, a y value of 42, and a z value of 1. Accordingly, as an example, upper left corner 410 can have a coordinate value of (71, 42, 1) in the translated coordinate system.

Figure 3:
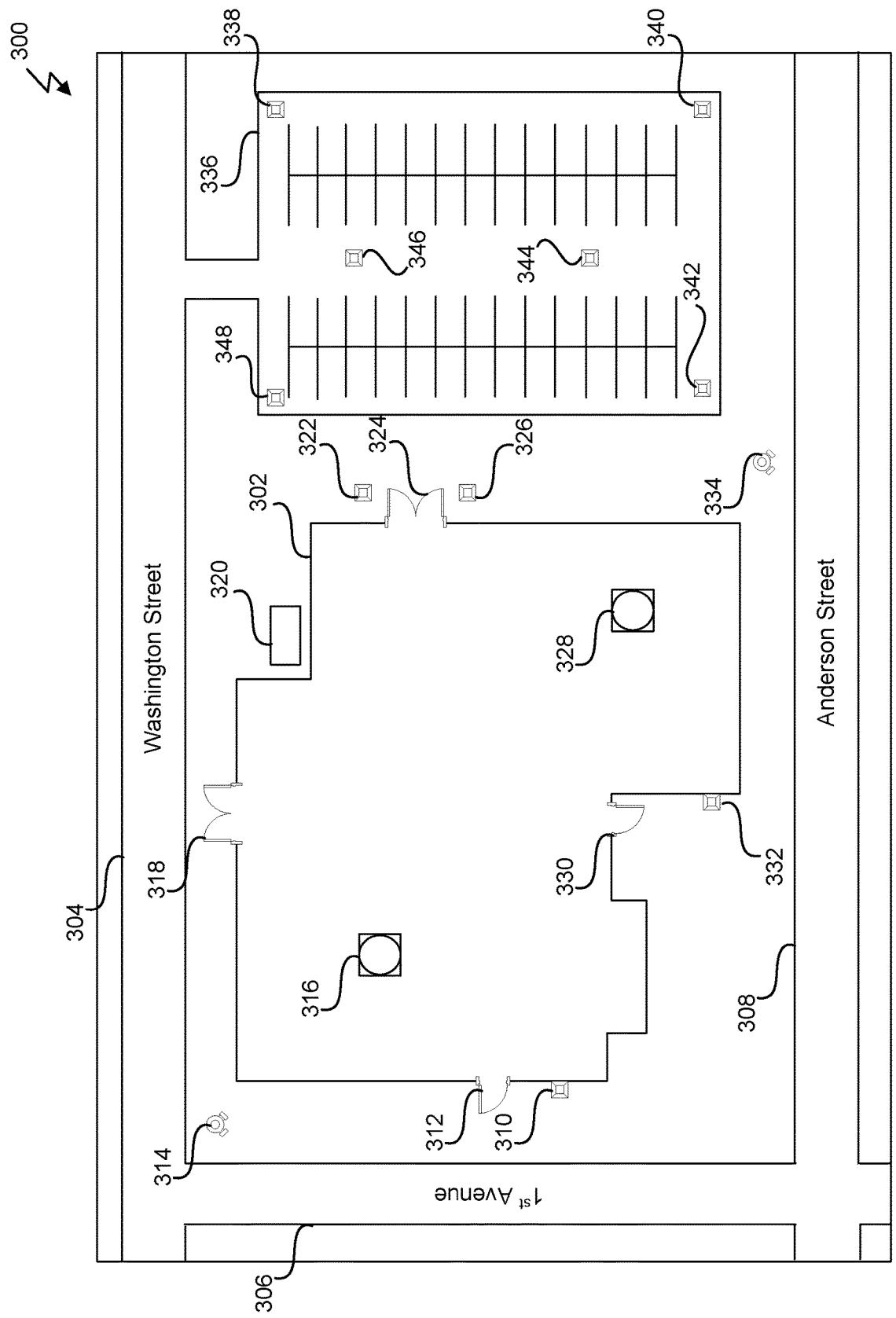
FIG. 3 illustrates an exemplary user interface including an exterior digital map of a geographical location with a physical building.

The image can include a geographical region that includes, for example, an area sufficient to capture the closest cross streets as shown, for example in FIG. 3. Central server 140 can also receive images of the interior of the physical building within the geographical region. In some embodiments, the images can be digital images. In some embodiments, the images can be digital line drawings. In some embodiments, the images can be digital photographs. Using the images of the interior of the building, the translated coordinate system, and the image of the geographical region, the central server can generate digital line drawings (e.g., if the images are not already line drawings or if they are not properly lined up in the translated coordinate system). The digital line drawings can be similar to those depicted in FIGS. 3 and 4 for use in a user interface for a user to view the digital line drawings as described in more detail herein.

Once the digital line drawings are generated, the central server 140 can receive information about devices 130a through 130n. The information can include location information (e.g., the location within the building or geographical area), the type of device, the manufacturer of the device, the model and serial number for the device, and so forth. This information can be provided by one of user devices 105, 110, 115, and/or 120 or any other computer system. The information can be uploaded to database 145, for example, so that central server 140 can retrieve the information from the database 145. Central server 140 can correlate the information for each device to the digital line drawings making a map with each digital line drawing to have a set of digital maps that include a map of the exterior of the building and the entirety of the geographical location, each interior space of the building, and the devices within the digital maps based on their locations in and around the building.

Devices 130a through 130n can create sensor data based on information captured by their respective sensors and send the sensor data that is intercepted by sensor data interceptor 135. For example, thermostat 130b can transmit current thermostat setting information and current temperature information, and camera 130a can include a motion sensor and can transmit detected motion with a timestamp and a 15 second video triggered by the sensed motion. Sensor data interceptor 135 can reformat the sensor data into a format compatible with and usable by central server 140. Sensor data interceptor 135 can transmit the reformatted sensor data to central server 140. Central server 140 can store the reformatted sensor data in database 145. Central server 140 can correlate the sensor data to the devices within the digital maps.

One or more of user devices 105, 110, 115, and/or 120 can access the user interface provided by central server 140 to view the digital maps. For example, a user using laptop 105 can access the user interface to view the digital maps of the building and see, for example, the digital maps including the sensor data. For example, the user of laptop 105 can view the 15 second video and see the timestamp for which the video was taken by, for example, clicking on the security camera 130a on the digital map on which it is located. As another example, the user of laptop 105 can view the current temperature and thermostat settings for thermostat 130b.

Figure 2:
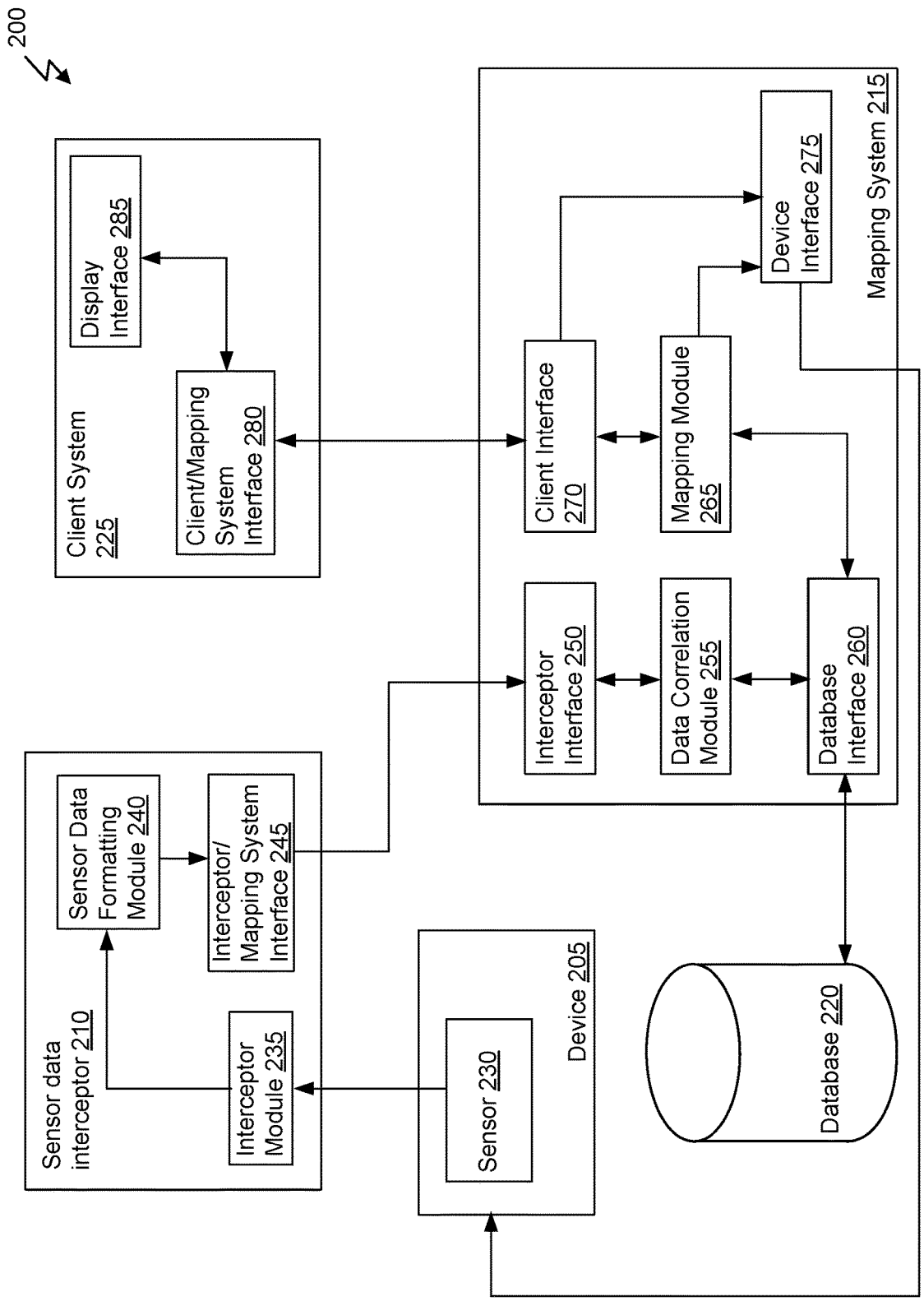
FIG. 2 illustrates a simplified block diagram of a system for providing sensor monitoring and mapping in a translated coordinate system.

FIG. 2 illustrates a simplified block diagram of a system 200 for providing sensor monitoring and mapping in a translated coordinate system. System 200 can be a block diagram of components of system 100. System 200 can include a device 205, a sensor data interceptor 210, a mapping system 215, a database 220, and a client system 225. While each component of system 200 includes one or more modules and/or interfaces, other amounts and configurations of interfaces and modules can be used. For example, the functionality described herein can be generated in a number of different configurations by, for example, using fewer or more modules and/or interfaces. The specific configuration described herein for simplicity is not intended to limit the scope of the description.

Database 220 can be any suitable database, such as for example, database 145 as described with respect to FIG. 1. Database 220 can be used to store information such as digital maps, sensor data, information about the devices 205, user login and credentialing information, and any other suitable data for use in the system 200 for providing sensor monitoring and mapping.

Device 205 can be any suitable device that includes a sensor 230. For example, device 205 can be any of devices 130a through 130n as described with respect to FIG. 1. For example, device 205 can be a security camera, a thermostat, a carbon monoxide detector, a smoke detector, a temperature sensor within a cooling unit (e.g., a freezer or refrigeration unit), a motion detector, or any other device that outputs sensor data. While only a single device 205 is depicted for simplicity, any number of devices 205 can be in system 200.

Sensor 230 can be any suitable sensor that is capable of sensing information and transmitting it. For example, sensor 230 can be a motion sensor, a light sensor, a temperature sensor, a carbon monoxide sensor, a smoke sensor, or any other suitable sensor. The sensor 230 can be integrated within or attached to device 205 in any suitable way. Sensor 230 can communicate with interceptor module 235 of sensor data interceptor 210. While device 205 depicts a single sensor 230 for simplicity, any number of sensors can be included in device 205. For example, some combination carbon monoxide and smoke detectors can include both a carbon monoxide sensor and a smoke sensor.

Sensor data interceptor 210 can be, for example, sensor data interceptor 135 as described with respect to FIG. 1. While only a single sensor data interceptor 210 is depicted, multiple servers or computers can be utilized to create the functionality of sensor data interceptor 210. For example, a server farm, cloud computing, or any other suitable multi-computer or multi-processor system can be used for sensor data interceptor 210. Sensor data interceptor 210 can include an interceptor module 235, a sensor data formatting module 240, and an interceptor/mapping system interface 245.

Interceptor module 235 can be a module for intercepting communications of sensor data from sensor 230. In some embodiments, interceptor module 235 receives the communications sent from sensor 230. In some embodiments, interceptor module 235 monitors the communications from sensor 230 and intercepts the communications, which aren't sent directly to interceptor module 235.

Sensor data formatting module 240 receives the sensor data from the interceptor module 235 and formats the sensor data to be compatible with and usable by mapping system 215. Because multiple devices 205 (though only one is shown) can be manufactured by multiple manufacturers and provide sensor data in a variety of proprietary formats, sensor data formatting module 240 can reformat the sensor data to provide the relevant sensor data to the mapping system 215 in a format that mapping system 215 can utilize.

Interceptor/mapping system interface 245 can receive the reformatted sensor data from the sensor data formatting module 240, and transmit it to the interceptor interface 250 of mapping system 215.

Mapping system 215 can be, for example, central server 140 as described with respect to FIG. 1. While only a single mapping system 215 is depicted, multiple servers or computers can be utilized to create the functionality of sensor data interceptor 210. For example, a server farm, cloud computing, or any other suitable multi-computer or multi-processor system can be used for mapping system 215. Mapping system 215 can include interceptor interface 250, data correlation module 255, database interface 260, mapping module 265, client interface 270, and device interface 275.

Interceptor interface 250 can interface with the interceptor/mapping system interface 245 of the sensor data interceptor 210. For example, interceptor interface 250 can receive the reformatted sensor data via the interceptor/mapping system interface 245.

Data correlation module 255 can interface with interceptor interface 250 to obtain the reformatted sensor data. Data correlation module 255 can correlate the sensor data with the appropriate device 205 as depicted in the digital maps. For example, sensor data from sensor 230 can be correlated to the sensor 230 as stored in database 220. Data correlation module 255 can interface with the database through database interface 260.

Database interface 260 can interface the mapping system 215 with database 220. Database interface 260 can communicate with data correlation module 255 to receive information for storing in database 220 and retrieve data from database 220 for use by data correlation module 255. Database interface 260 can also communicate with mapping module 260 for storing information from mapping module 265 in database 220 or retrieving data from database 220 for use by mapping module 265.

Figure 4:
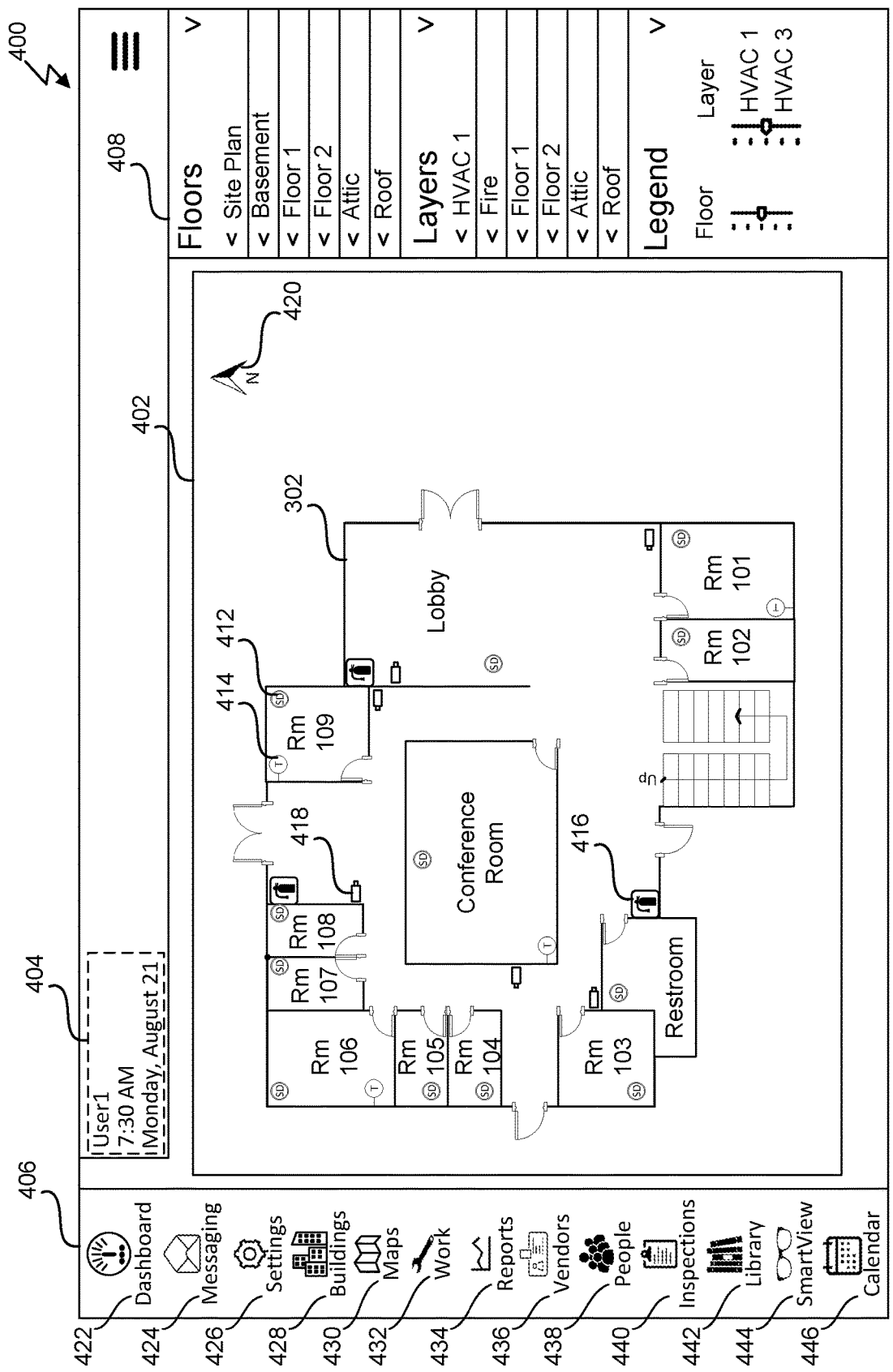
FIG. 4 illustrates an exemplary user interface including an interior digital map of a physical building.

Mapping module 265 can obtain information from database 220 via database interface 260 for creating visual maps for display in a user interface of the digital maps of the physical building and geographical region as described with respect to FIG. 1 and depicted with respect to FIGS. 3 and 4. The visual depictions of the digital maps can be generated by mapping module 265 and sent to client interface 270 for providing to a user of client system 225. In some embodiments, mapping module can communicate with device interface 275 to send instructions to device 205 in response to alerts, for example.

Device interface 275 can communicate with client interface 270 to receive sensor updates that can be transmitted to sensor 230. For example, modifying a set value of a thermostat to hold the temperature at 70 degrees Fahrenheit and not allow modifications to the faceplate of the thermostat can allow an administrator to control a building or a portion of a building to keep others from inadvertently changing the setting and/or setting it too low such that pipes freeze. Therefore, device interface 275 can receive instructions from client interface 270 and transmit the instructions to sensor 230 for implementation.

Client system 225 can be, for example, user devices 105, 110, 115, and/or 120 as described with respect to FIG. 1. The client system 225 can be any suitable system for viewing a user interface that can include the digital maps and sensor data for the building housing device 205. Client system 225 can include a client/mapping system interface 280 and a display interface 285.

Client/mapping system interface 280 can allow client system 225 to interface with client interface 270 of mapping system 215. The client mapping system interface 280 can receive the user interface information, including the visual representation of the digital maps and the sensor data and data corresponding to device 205, and provide the user interface to the display interface 285 for display on a screen of client system 225.

In use, a user of client system 225 can log into a user interface provided by mapping system 215 through, for example, a web browser interface. The user can provide login credentials that client/mapping system interface 280 can transmit through client interface 270 to mapping system 215. While authentication is not described in detail herein, the user can be authenticated by mapping system 215 using credential information stored in database 220.

Once authenticated, the user can view digital maps of a geographical region selected or allowed for viewing for the user. The digital maps can be stored in database 220 and when requested by the user, the client/mapping system interface 280 can transmit the request to client interface 270. Client interface 270 can send the request to mapping module 265, which can query database 220 through database interface 260, to obtain the information requested and generate a visual depiction of the digital maps.

On a continuous basis, device 205, which can be physically located in the geographical region for which digital maps are displayed to the user of client system 225, can be capturing sensor data with sensor 230 and providing that sensor data to interceptor module 235. Interceptor module 235 can provide the sensor data to sensor data formatting module 240 for reformatting into a compatible/useful format for mapping system 215. The reformatted sensor data can be provided to the data correlation module 255 via the interceptor/mapping system interface 245 in communication with interceptor interface 250. Data correlation module 255 can correlate the reformatted sensor data to the digital maps the user is viewing and store the sensor data in database 220. Optionally, the update of sensor data in database 220 can trigger an update of the digital maps such that the user interface being viewed by the user of client system 225 can be updated automatically by mapping module 265. Each sensor 230 or device 205 can have a location (e.g., an x, y, z coordinate) in the translated coordinate system which can allow the mapping system 215 to accurately depict the location on the digital maps.

Optionally, mapping module 265 can further determine whether sensor data exceeds a threshold value or indicates and alert status. For example, an indicator that motion detected from a motion sensor during closed hours of the building could indicate an alert status. As another example, a smoke detector having provided sensor data indicating that the smoke detector is alarming, or that the sensor detected a sufficient value of smoke that exceeds a threshold can indicate an alert status. If the mapping module 265 identifies an alert status, settings can be configured to create various responses. Optionally, the user interface can be updated with alert status information, as shown for example in FIG. 6. Optionally, the fire department can be alerted by an automated telephone call or other alarm mechanism if, for example, a smoke detector sensor detects smoke. Optionally, mapping module 265 can communicate with device interface 275 to cause a device to respond to the alert status. For example, in response to a carbon monoxide alert, mapping module 265 can send an instruction to shut off gas to devices within the room that is experiencing the alert.

FIG. 3 illustrates an exemplary user interface 300 including an exterior digital map of a geographical location with a physical building 302. The user interface 300 can be displayed when requested by a user on, for example, user device 105, 110, 115, and/or 120 as described with respect to FIG. 1 or client system 225 as described with respect to FIG. 2. The user interface 300 can be an adaptable design that allows use on a variety of mobile devices, tables, and larger format displays. When displaying on a device, the module responsible for providing the user interface (e.g., client interface 270) can detect the device being used as well as the display format and configure the output display appropriately. As shown, the exterior of building 302 is shown including surrounding features. The geographical area includes cross streets 304, 306, and 308. Further shown are outside lighting features 310, 332, 326, and 322. Additionally, fire hydrants 314 and 334 are shown. The building 302 includes doors 312, 318, 324, and 330 which are shown. Other exterior features can be shown such as HVAC units 316 and 328 which can be located on the roof of building 302. A dumpster 320 can also be depicted. Parking lot 336 can also be displayed including lighting features 338, 340, 3142, 344, 346, and 348. Other various features not displayed here can also be included, such as security cameras, windows on building 302, and any other suitable object. For example, security cameras can be included that, when selected can provide real-time video, stored video, camera information, and so forth. In some embodiments, lighting features, such as lighting feature 310 can be a device such as device 205 as described with respect to FIG. 2. Lighting feature 310 can include a motion sensor that, when activated, causes the lighting feature 310 to activate. Lighting feature 310 can provide sensor data in the form of motion detected sensor data to the mapping system 215 as described with respect to FIG. 2, such that when the light is on, the map can have a depiction of an illumination symbol, for example. Optionally, when the light is selected a popup window can include a status indicator that provides a listing of times and the status changes including a current status of "on," for example.

FIG. 4 illustrates an exemplary user interface 400 including an interior digital map 402 of the physical building 302 as described with respect to FIG. 3. The digital map 402 can be generated by, for example, central server 140 as described with respect to FIG. 1. As shown in FIG. 4, the user interface 400 can include a digital map 402, user data 404, a function selector pane 406, and a location pane 408.

User information 404 can include, for example, a user name, the date, and the time. Optionally, the user information 404 can include any other information including a status bar that might include notifications of, for example, messages received via the system from other users, alerts from the system, and so forth. Optionally, the user information 404 can include the name of the property currently being viewed, last login information, length of current login, and so forth.

Function selector pane 406 can include selectable options for changing the view currently shown to provide a view of a dashboard 422, messages 424, settings 426, buildings 428, maps 430, work 432, reports 434, vendors 436, people 438, inspections 440, library 442, smartview 444, and calendar 446. Dashboard 422 can change the view to a dashboard that can show, for example, notifications and other important alerts, and general health of any given selected building. Messages 424 can provide a view of messages received from other users through the system. Settings 426 can allow the user to set various settings including, color schemes, themes, default page views, orientation of where panes exist within pages (e.g., the function selector pane 406), and so forth. Buildings 428 can provide a listing of monitored buildings and allow the user to select the building to view. Maps 430 can include a listing of mapped areas that include monitored buildings. Work 432 can provide a listing of work orders that are pending and/or complete for the selected building and/or any building being monitored. Reports 434 can include a listing of reports for the selected building and/or any building being monitored. Vendors 436 can include a list of vendors including preferred vendors for use in maintenance for the building. People 438 can include a contact listing of people associated with the building including, for example, building managers, custodians, administrators, owners, tenants, and so forth. The contact listing can include contact information and the people listed in people 438 can be used to set up notifications and alerts. Inspections 440 can include a listing of inspections set for the currently selected building. For example, inspections set for approval of completed work can appear in the inspections listing. The inspections can be city inspections and/or admin inspections to confirm work was properly completed. Library 442 can include a listing of links that contain helpful information related to the currently selected building. Smartview 444 can include a view of the currently selected building that highlights the most important aspects including, for example, notifications for various devices, and so forth. Calendar 446 can include a calendar with important scheduling information for the currently selected building including, for example, the work scheduled, inspections scheduled, tenant changes, and so forth. Optionally, users can use an included set of tools to measure lengths and areas on the digital maps and store the measurements. Optionally, the users can configure the user interface to display the measurements on the digital maps.

Location selector pane 408 can include a listing of floors, layers, and a legend. The listing of floors can show the available floors for selection such that, for example, if Floor 2 is selected, the digital map of Floor 2 will replace the currently selected Floor 1 map shown in digital map 402. The listing of layers can include various layers including a fire layer, one or more HVAC layers, layers for each floor, and so forth. Selection of, for example, HVAC 1, can cause the devices associated with the HVAC 1 layer to be highlighted or alternatively not greyed out. For example, thermostats, heating and cooling units, ducting, and any other items that might be associated with an HVAC system, and specifically associated with the HVAC 1 system can be highlighted. The legend area can show which floor and/or layer is currently selected.

The digital map 402 can include a digital map of the physical building 302, for example, of a selected floor. In FIG. 4, the selected floor can be, for example, the first floor. The digital map 402 can include a compass 420 to identify direction. The digital map 402 can include a floor map that shows various rooms and devices. For example, each room can be labelled with a label name such as "Lobby," "Restroom," "Conference Room," "Rm 106," and so forth. Also displayed are various devices, such as devices 130a through 130n as described with respect to FIG. 1. For example, security camera 418, smoke detector 412, thermostat 414, fire extinguisher 416, and so forth. The devices on the digital map 402 can be selectable to view real-time data. The real-time data can be sensor data that is intercepted by, for example, sensor data interceptor 210 of FIG. 2.

Figure 5:
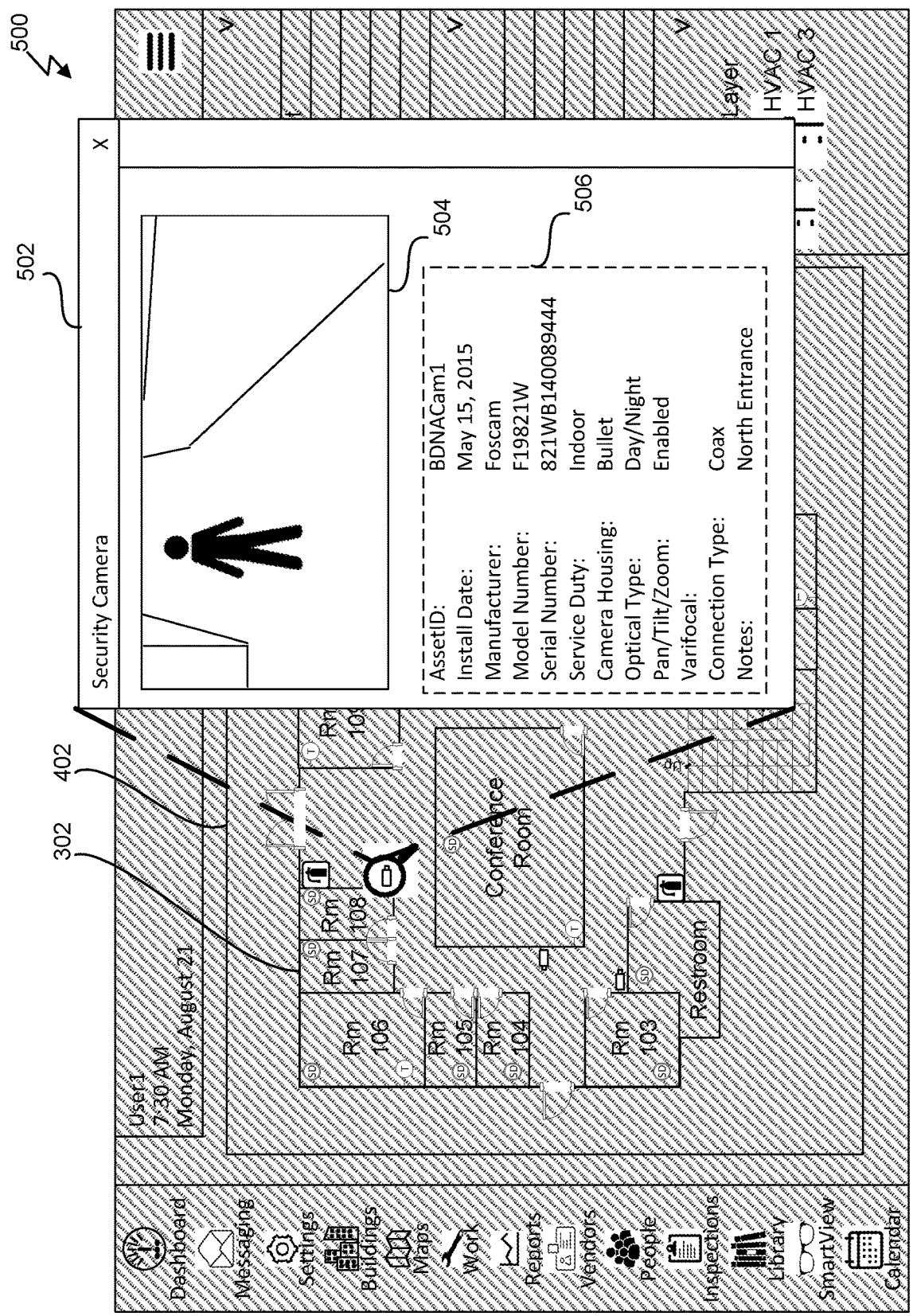
FIG. 5 illustrates an exemplary user interface including an interior digital map of a physical building showing sensor data from a security camera.

FIG. 5 illustrates an exemplary user interface 500 including an interior digital map 402 of a physical building 302 showing sensor data from security camera 418. The selection can cause popup window 502 to display. Popup window 502 can include, for example, the video feed 504 and the information section 506. The video feed 504 can include real-time video of the security camera 418. The information section 506 can include information about the security camera 418 including, an ID, the date it was installed, the manufacturer, the model number, the serial number, the type of camera (e.g., indoor, outdoor, etc.), the camera housing type, the optical type, the ability to pan, tilt, or zoom, the type of connection used, and any further notes.

Figure 6:
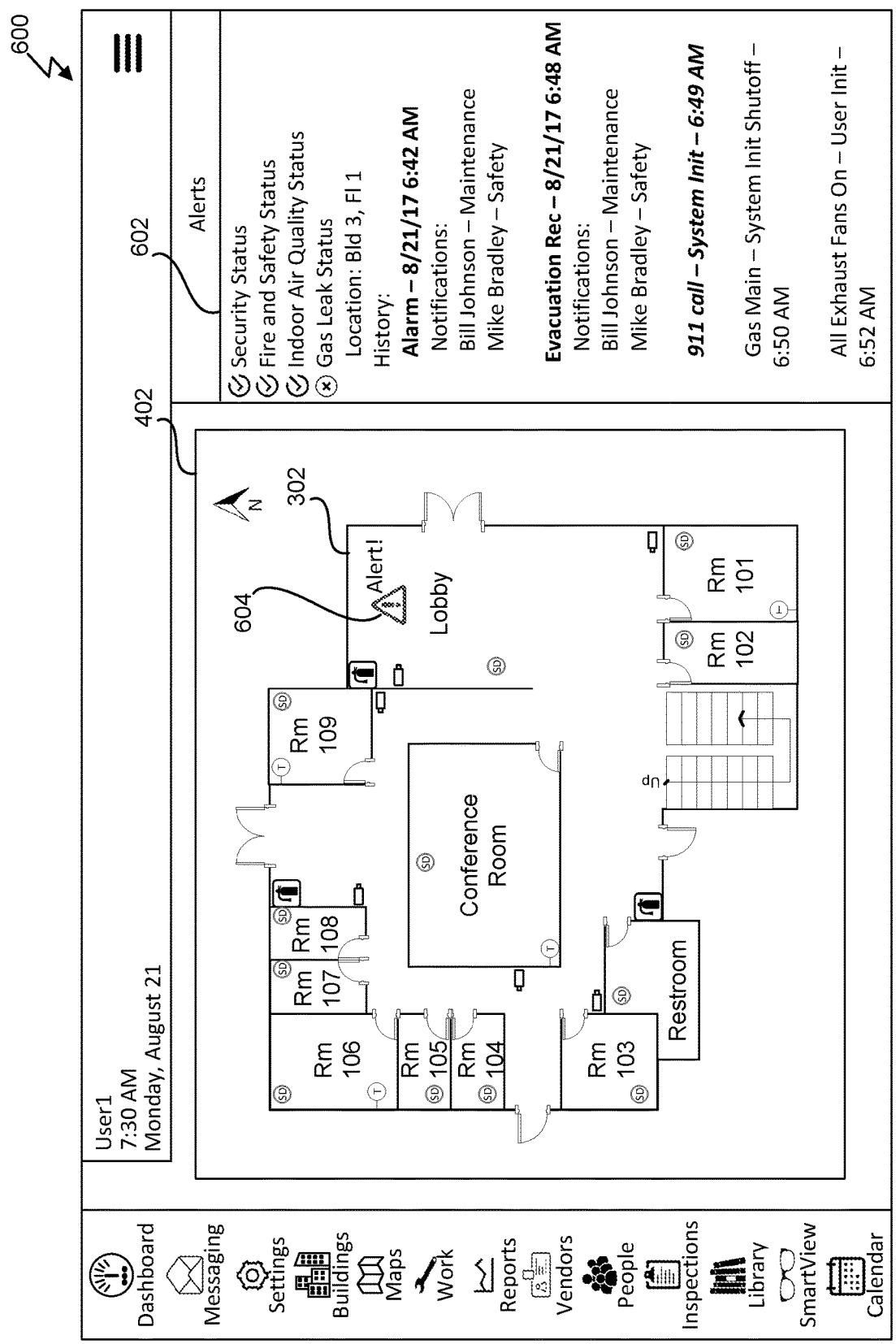
FIG. 6 illustrates an exemplary user interface including an interior digital map of a physical building showing alert information.

FIG. 6 illustrates an exemplary user interface 600 including an interior digital map 402 of a physical building 302 showing alert information 602. The alert can be generated by, for example, central server 140 as described with respect to FIG. 1. The alert can be displayed by alert icon 604 in the location in the map where the alert was detected. For example, as shown in FIG. 6, the alert can be shown in the lobby. The alert information 602 can show for example, that the security status is acceptable, the fire and safety status is acceptable, and the indoor air quality status is acceptable. The alert information 602 can further include the gas leak status as unacceptable. The location can be building 3, floor 1. And the history can show that an alarm went off on Aug. 21, 2017 at 6:42 am. The alarm resulted in notification being sent to Bill Johnson and Mike Bradley. For example, Bill Johnson and Mike Bradley can be set up in the people listing 438 as described with respect to FIG. 4. Further, Bill Johnson and Mike Bradley can be configured in the people listing 438 or in the settings configuration 426 to be notified when an alert occurs. The configuration can include a number or email address to send the alert. Alternatively, mobile devices can receive push notifications from an application configured to communicate with central server 140. The central server 140 of FIG. 1 can process the alert and make an evacuation recommendation, which occurred at 6:48 am and notifications of the evacuation recommendation were also sent to Bill Johnson and Mike Bradley as shown in FIG. 6. The central server 140 can further make a 911 system call, which initiated at 6:49 am. The central server 140 can further process a system initiated shutoff of the gas main to attempt to mitigate the gas leak, which initiated at 6:50 am. Further central server 140 identified that all exhaust fans were turned on by a user at 6:52 am. For example, one of the notified users can click a link on the notification or log into the user interface 600 and process an instruction to turn on exhaust fans.

Figure 7:
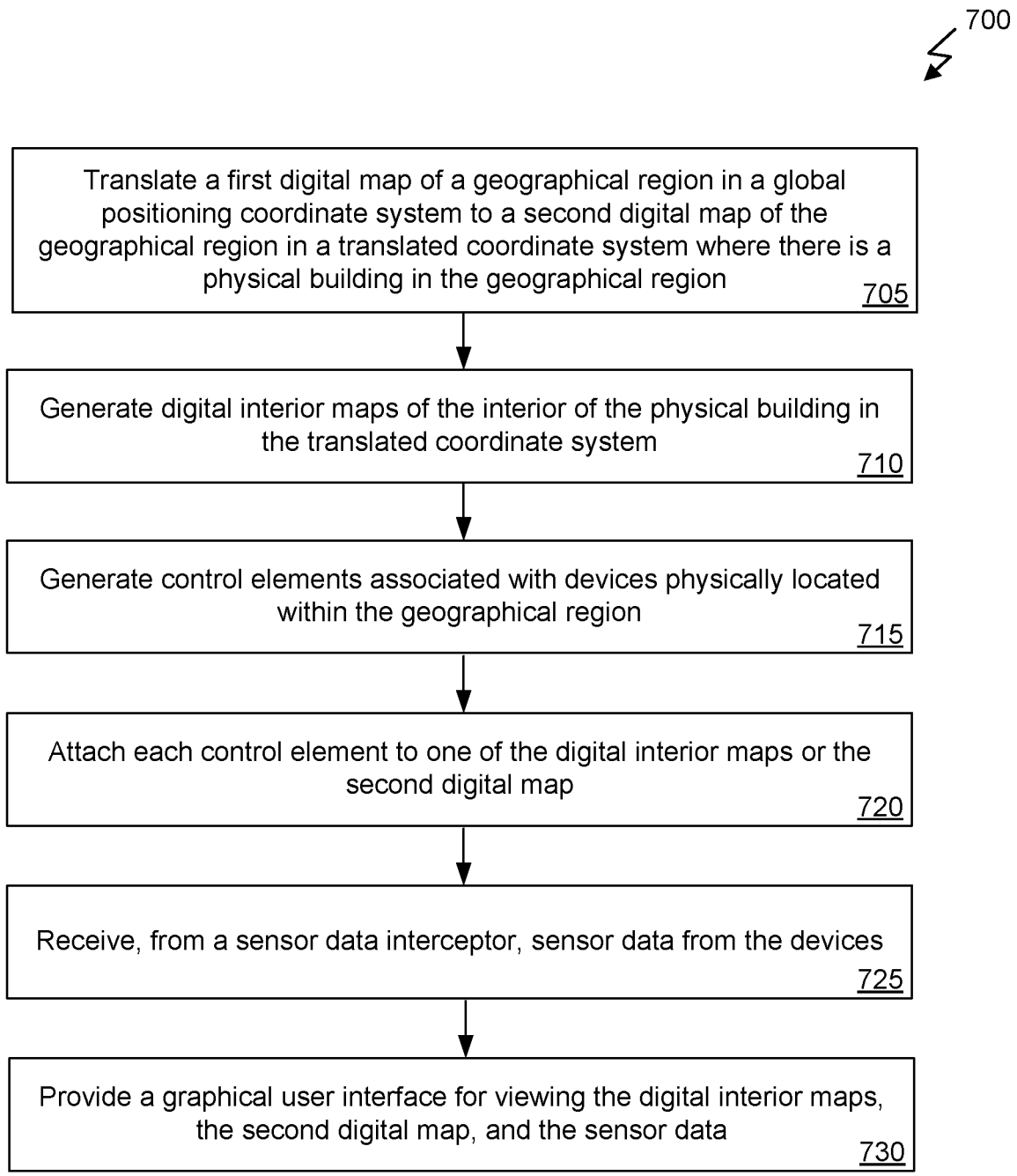
FIG. 7 illustrates an exemplary flowchart of a method for providing sensor monitoring and mapping in a translated coordinate system.

FIG. 7 illustrates an exemplary flowchart of a method 700 for providing sensor monitoring and mapping in a translated coordinate system. The method 700 can be executed by, for example, central server 140 of FIG. 1. At step 705, the central server can translate a first digital map of a geographical region in a global positioning coordinate system to a second digital map of the geographical region in a translated coordinate system where there is a physical building in the geographical region. For example, the central server can receive a digital photograph containing a satellite image of the geographical region that includes a building for which monitoring and mapping is needed. The central server can generate a digital line drawing map of the digital image and create a coordinate system for use in the digital line drawing map.

At step 710, the central server can generate digital interior maps of the interior of the physical building in the translated coordinate system. As described previously, the central server can receive digital photographs or images of the interior of the building, which can be used to create digital line drawing maps of the interior of the building, such as the digital map 402 of FIG. 4.

At step 715, the central server can generate control elements associated with devices physically located within the geographical region. For example, a control element for security camera 418 of FIG. 4 was generated. The control element, when selected, can provide information on the device associated with it (e.g., information in information section 506 of FIG. 5) and other sensor or surveillance information from the device (e.g., video feed 504 of FIG. 5).

At step 720, the central server can attach each control element to one of the digital interior maps or the second digital map. For example, the security camera 418 was attached to the first floor map of building 3 to represent the location at which the security camera is physically located.

At step 725, the central server can receive, from the sensor data interceptor (e.g., sensor data interceptor 135 of FIG. 1) sensor data from the devices. For example, motion sensor data, temperature sensor data, and so forth.

At step 730, the central server can provide a graphical user interface for viewing the digital interior maps, the second digital map, and the sensor data. For example, FIGS. 3, 4, 5, and 6 provide exemplary user interfaces for viewing digital maps and sensor data.

Figure 8:
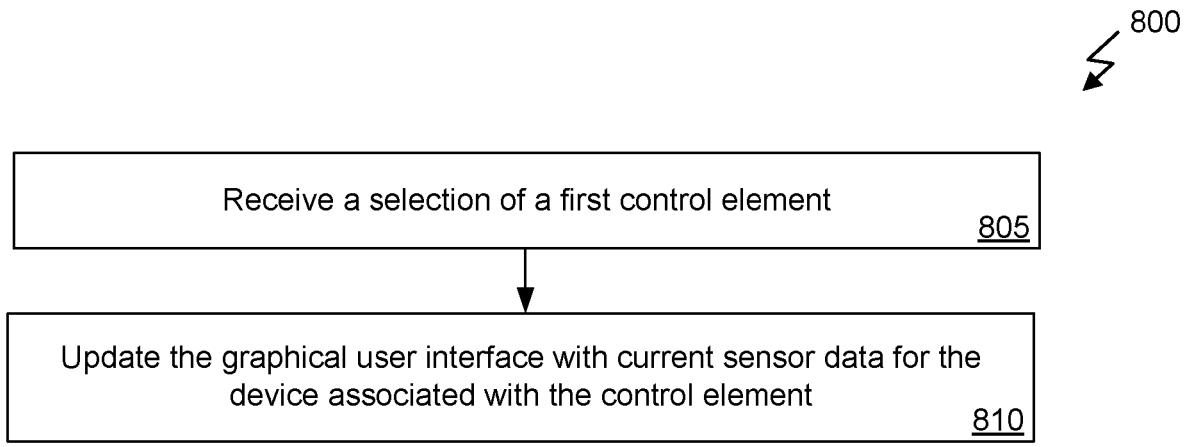
FIGS. 8, 9, 10, and 11 illustrate other exemplary flowcharts of methods for providing sensor monitoring and mapping in a translated coordinate system.

FIG. 8 illustrates an exemplary flowchart of a method 800 for providing sensor monitoring and mapping in a translated coordinate system. Method 800 can be performed with method 700 of FIG. 7. Method 800 can be performed by, for example, central server 140 of FIG. 1.

At step 805, the central server can receive a selection of a first control element. For example, the central server can receive a selection of a thermostat. At step 810, the central server can update the graphical user interface with current sensor data for the device associated with the control element. For example, the user interface can be updated with a current status of operation (e.g., normal), the current temperature, a current thermostat setting, and whether the faceplate is locked to entries from the faceplate.

Figure 9:
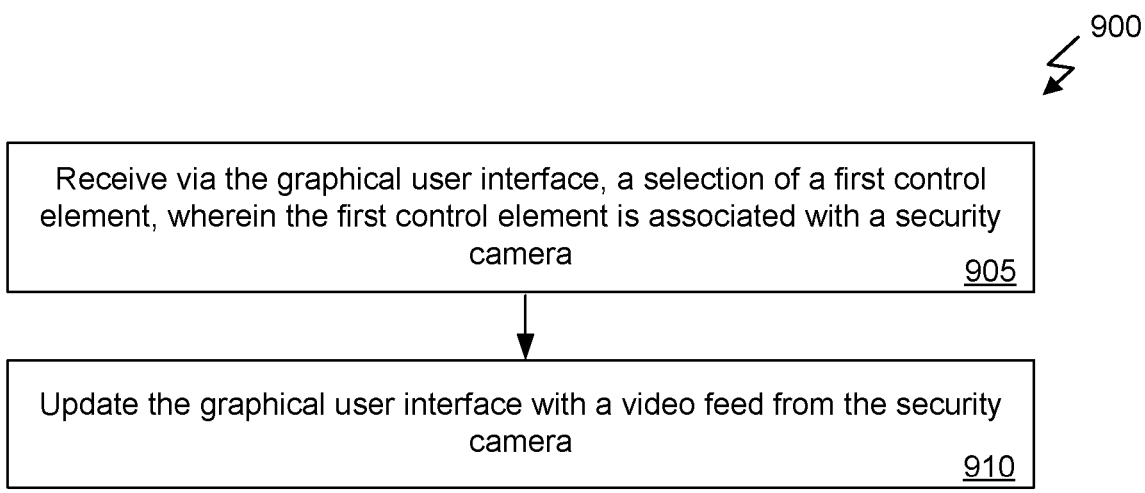

FIG. 9 illustrates an exemplary flowchart of a method 900 for providing sensor monitoring and mapping in a translated coordinate system. Method 900 can be performed with method 700 of FIG. 7. Method 900 can be performed by, for example, central server 140 of FIG. 1.

At step 905, the central server can receive a selection of a first control element associated with a security camera. For example, the central server can receive a selection of security camera 418 of FIG. 4. At step 910, the central server can update the graphical user interface with a video feed from the security camera. For example, FIG. 5 shows a depiction of a popup window 502 showing current information for security camera 418, including the video feed 504.

Figure 10:
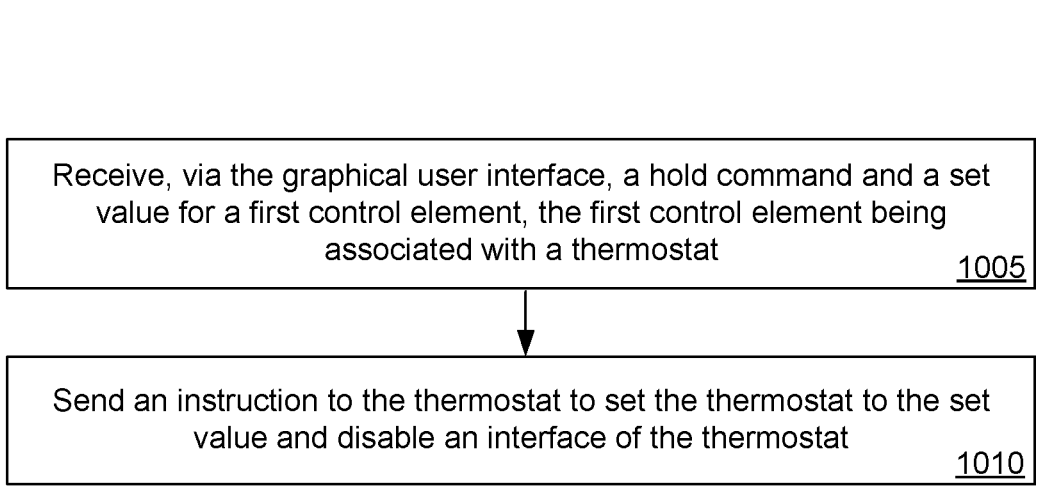

FIG. 10 illustrates an exemplary flowchart of a method 1000 for providing sensor monitoring and mapping in a translated coordinate system. Method 1000 can be performed with method 700 of FIG. 7 and/or method 800 of FIG. 8. Method 1000 can be performed by, for example, central server 140 of FIG. 1.

At step 1005, the central server can receive, via the graphical user interface, a hold command and a set value for a first control element associated with a thermostat. For example, the user of the graphical user interface can select the thermostat control element to pull up information on the thermostat. The user interface can further provide an editing screen that allows the user to hold the temperature for the thermostat at a specified value.

At step 1010, the central server can send an instruction to the thermostat to set the thermostat to the set value and disable the interface of the thermostat so that users trying to change the thermostat using the thermostat interface on the device do not affect the thermostat settings. This can be useful when, for example, tenants turn the thermostat to an unreasonably cold temperature before leaving, which can allow pipes to freeze.

Figure 11:
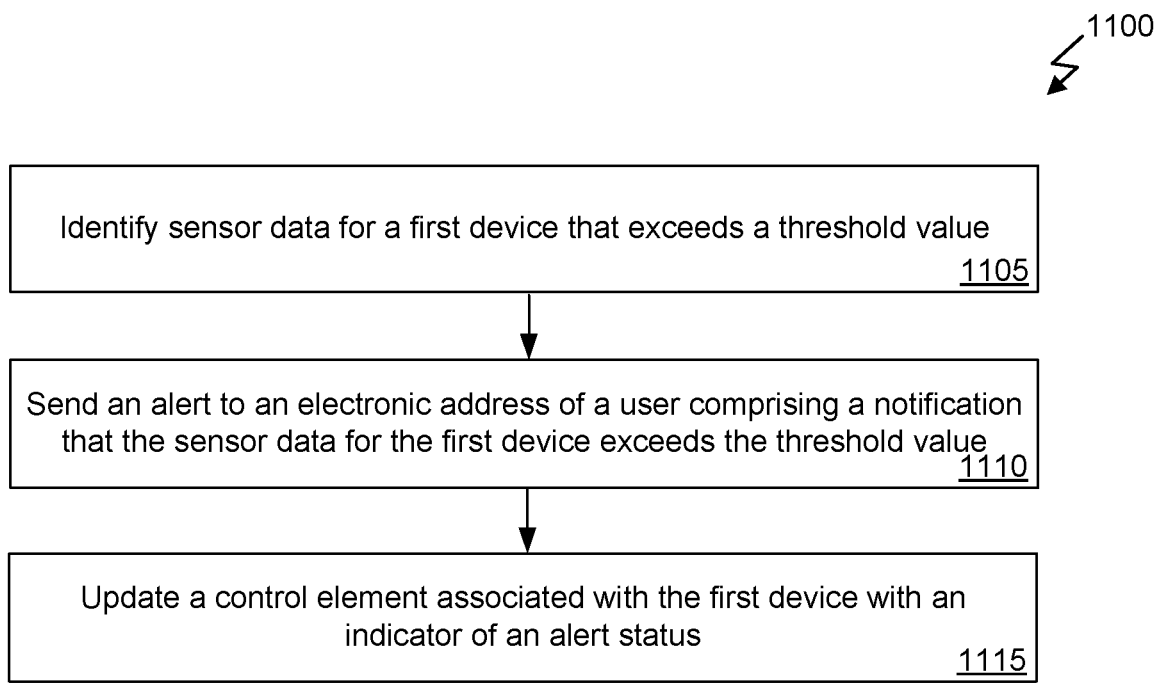

FIG. 11 illustrates an exemplary flowchart of a method 1100 for providing sensor monitoring and mapping in a translated coordinate system. Method 1100 can be performed with method 700 of FIG. 7, method 800 of FIG. 8, method 900 of FIG. 9, and/or method 1000 of FIG. 10. Method 1100 can be performed by, for example, central server 140 of FIG. 1.

At step 1105, the central server can identify sensor data for a first device that exceeds a threshold value. For example, a gas detector can determine that the gas levels in a room or area are over a threshold value.

At step 1110, the central server can send an alert to an electronic address of a user comprising a notification that the sensor data for the first device exceeds the threshold value. For example, the notifications can be sent to an email address, a text number, and/or a push notification to a user having an application associated with the central server installed. The notification can include information regarding the type of problem (e.g., a gas leak), the time it was detected, and the severity of the problem.

At step 1115, the central server can update a control element associated with the first device with an indicator of an alert status. For example, the alert icon 604 of FIG. 6 and/or the listing of alerts can be used to notify the user when the user logs into the user interface that alerts exist.

FIG. 12 illustrates an embodiment of a computer system 1200. A computer system 1200 as illustrated in FIG. 12 may be incorporated into devices such as a television receiver, DVR, television, media system, personal computer, smartphone, tablet, and the like. FIG. 12 provides a schematic illustration of one embodiment of a computer system 1200 that can perform some or all of the steps of the methods provided by various embodiments. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner.

The computer system 1200 is shown comprising hardware elements that can be electrically coupled via a bus 1205, or may otherwise be in communication, as appropriate. The hardware elements may include one or more processors 1210 (e.g., processor 152 and processor 194 of FIG. 1), including without limitation one or more general-purpose processors and/or one or more special-purpose processors such as digital signal processing chips, graphics acceleration processors, and/or the like; one or more input devices 1215, which can include without limitation a mouse, a keyboard, a camera, a remote control, and/or the like; and one or more output devices 1220, which can include without limitation a display device, a printer, and/or the like.

The computer system 1200 may further include and/or be in communication with one or more non-transitory computer-readable storage devices 1225, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1200 might also include a communications subsystem 1230, which can include without limitation a modem, a network card (wireless or wired), an infrared communication device, a wireless communication device, and/or a chipset such as a Bluetooth® device, an 802.11 device, a Wi-Fi device, a WiMax device, cellular communication facilities, etc., and/or the like. The communications subsystem 1230 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1230. In other embodiments, a portable electronic device may be incorporated into the computer system 1200 as an input device 1215. In many embodiments, the computer system 1200 will further comprise a working memory 1235, which can include a RAM or ROM device, as described above.

The computer system 1200 also can include software elements, shown as being currently located within the working memory 1235, including an operating system 1240, device drivers, executable libraries, and/or other code, such as one or more application programs 1245, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIGS. 9 and 10, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 1225 described above. In some cases, the storage medium might be incorporated within a computer system, such as computer system 1200. In other embodiments, the storage medium might be separate from a computer system (e.g., a removable medium), such as a compact disc, and/or provided in an installation package, such that the storage medium can be used to program, configure, and/or adapt a general purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 1200 to perform methods in accordance with various embodiments of the technology. According to a set of embodiments, some or all of the procedures of such methods are performed by the computer system 1200 in response to processor 1210 executing one or more sequences of one or more instructions, which might be incorporated into the operating system 1240 and/or other code, such as an application program 1245, contained in the working memory 1235. Such instructions may be read into the working memory 1235 from another computer-readable medium, such as one or more of the storage device(s) 1225. Merely by way of example, execution of the sequences of instructions contained in the working memory 1235 might cause the processor(s) 1210 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 1200, various computer-readable media might be involved in providing instructions/code to processor(s) 1210 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1225. Volatile media include, without limitation, dynamic memory, such as the working memory 1235.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1200.

The communications subsystem 1230 and/or components thereof generally will receive signals, and the bus 1205 then might carry the signals and/or the data, instructions, etc. carried by the signals to the working memory 1235, from which the processor(s) 1210 retrieves and executes the instructions. The instructions received by the working memory 1235 may optionally be stored on a non-transitory storage device 1225 either before or after execution by the processor(s) 1210.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

The invention claimed is:

1. A method comprising:
translating, by a computer system, a first digital map of a geographical region in a global positioning coordinate system to a second digital map of the geographical region in a translated coordinate system, wherein the geographical region includes a physical building;
generating, by the computer system, a plurality of digital interior maps, each digital interior map in the plurality of digital interior maps describing a portion of an interior of the physical building in the translated coordinate system;
generating, by the computer system, a plurality of control elements, each control element of the plurality of control elements being associated with a device of a plurality of devices physically located within the geographical region;
attaching, by the computer system, each control element to one of the plurality of digital interior maps or the second digital map;
receiving, from a sensor data interceptor, sensor data from the plurality of devices; and
providing, by the computer system, a graphical user interface for viewing the plurality of digital interior maps, the second digital map, and the sensor data.

2. The method of claim 1, further comprising:
receiving, by the computer system via the graphical user interface, a selection of a first control element; and
updating, by the computer system, the graphical user interface with current sensor data for a first device associated with the first control element in response to the selection.

3. The method of claim 1, further comprising:
receiving, by the computer system via the graphical user interface, a selection of a first control element, wherein the first control element is associated with a security camera; and
updating, by the computer system, the graphical user interface with a video feed from the security camera.

4. The method of claim 1, further comprising:
receiving, by the computer system via the graphical user interface, a hold command and a set value for a first control element, the first control element being associated with a thermostat; and
sending an instruction, by the computer system, to the thermostat to set the thermostat to the set value and disable an interface of the thermostat.

5. The method of claim 1, further comprising:
identifying, by the computer system, sensor data for a first device that exceeds a threshold value;
sending, by the computer system, an alert to an electronic address of a user comprising a notification that the sensor data for the first device exceeds the threshold value; and
updating, by the computer system, a control element associated with the first device with an indicator of an alert status.

6. The method of claim 5, wherein, the indicator of the alert status comprises at least one of modifying a color of the control element or adding a flashing indicator to the control element.

7. The method of claim 5, wherein the notification comprises a link that, when selected on a computer of the user, launches the graphical user interface on the computer displaying a view of the control element.

8. The method of claim 1, wherein a first device of the plurality of devices is manufactured by a first manufacturer and a second device of the plurality of devices is manufactured by a second manufacturer.

9. A system, comprising:
a sensor data interceptor, comprising:
one or more interceptor processors; and
an interceptor memory storing thereon sensor data interceptor instructions that, when executed by the one or more interceptor processors, cause the one or more interceptor processors to:
receive sensor data from a plurality of devices, the devices comprising devices from a plurality of manufacturers;
reformat the sensor data to be compatible with a central application to create reformatted sensor data; and
transmit the reformatted sensor data to a central server; and
the central server, comprising:
one or more server processors; and
a server memory having stored thereon server instructions that, when executed by the one or more server processors, cause the one or more server processors to:
translate a first digital map of a geographical region in a global positioning coordinate system to a second digital map of the geographical region in a translated coordinate system, wherein the geographical region includes a physical building;
generate a plurality of digital interior maps, each digital interior map in the plurality of digital interior maps describing a portion of an interior of the physical building in the translated coordinate system;
generate a plurality of control elements, each control element of the plurality of control elements being associated with a device of a plurality of devices physically located within the geographical region;
attach each control element to one of the plurality of digital interior maps or the second digital map;
receive the reformatted sensor data from the sensor data interceptor; and
provide a graphical user interface for viewing the plurality of digital interior maps, the second digital map, and the reformatted sensor data.

10. The system of claim 9, wherein the server instructions comprise further instructions that, when executed by the one or more server processors, cause the one or more server processors to:
receive, via the graphical user interface, a selection of a first control element; and
update the graphical user interface with current sensor data for a first device associated with the first control element in response to the selection.

11. The system of claim 9, wherein the server instructions comprise further instructions that, when executed by the one or more server processors, cause the one or more server processors to:
receive, via the graphical user interface, a selection of a first control element, wherein the first control element is associated with a security camera; and
update the graphical user interface with a video feed from the security camera.

12. The system of claim 9, wherein the server instructions comprise further instructions that, when executed by the one or more server processors, cause the one or more server processors to:

receive, via the graphical user interface, a hold command and a set value for a first control element, the first control element being associated with a thermostat; and send an instruction to the thermostat to set the thermostat to the set value and disable an interface of the thermostat.

13. The system of claim 9, wherein the server instructions comprise further instructions that, when executed by the one or more server processors, cause the one or more server processors to:

identify, within the reformatted sensor data for a first device, first device sensor data that exceeds a threshold value;

send an alert to an electronic address of a user comprising a notification that the first device sensor data exceeds the threshold value; and update a control element associated with the first device with an indicator of an alert status.

14. The system of claim 13, wherein, the indicator of the alert status comprises at least one of modifying a color of the control element or adding a flashing indicator to the control element.

15. The system of claim 13, wherein the notification comprises a link that, when selected on a computer of the user, launches the graphical user interface on the computer displaying a view of the control element.

* * * * *